(12) United States Patent
Kang et al.

(10) Patent No.: US 12,491,909 B2
(45) Date of Patent: Dec. 9, 2025

(54) TRAVERSE DIRECTION CONTROL APPARATUS AND METHOD FOR AUTONOMOUS DRIVING

(71) Applicant: NEUBILITY INC., Seoul (KR)

(72) Inventors: Tae Won Kang, Seoul (KR); Chang Hyeon Park, Seoul (KR); Sung Woo Cho, Seoul (KR); Jeong Yeon Seo, Seoul (KR); Kee Hyuk Kang, Seoul (KR)

(73) Assignee: NEUBILITY INC., Seoul (KR)

( * ) Notice: Subject to any disclaimer, the term of this patent is extended or adjusted under 35 U.S.C. 154(b) by 0 days.

(21) Appl. No.: 18/872,624

(22) PCT Filed: Sep. 6, 2022

(86) PCT No.: PCT/KR2022/013377
§ 371 (c)(1),
(2) Date: Dec. 6, 2024

(87) PCT Pub. No.: WO2023/249163
PCT Pub. Date: Dec. 28, 2023

(65) Prior Publication Data
US 2025/0263091 A1    Aug. 21, 2025

(30) Foreign Application Priority Data
Jun. 21, 2022 (KR) .................. 10-2022-0075516

(51) Int. Cl.
*B60W 60/00* (2020.01)
*B60W 40/101* (2012.01)
(Continued)

(52) U.S. Cl.
CPC ........ *B60W 60/001* (2020.02); *B60W 40/101* (2013.01); *B60W 40/114* (2013.01);
(Continued)

(58) Field of Classification Search
CPC ............. B60W 60/001; B60W 40/101; B60W 40/114; B60W 2420/403; B60W 2520/06;
(Continued)

(56) References Cited

U.S. PATENT DOCUMENTS 11,292,123 B2 * 4/2022 Takagi ............... B25J 9/065
2018/0065242 A1   3/2018 Tanaka et al.
(Continued)

FOREIGN PATENT DOCUMENTS

CN    110015297 A  *  7/2019  .......... B60W 30/165
CN    115476881 A  * 12/2022  .......... B60W 60/001
(Continued)

OTHER PUBLICATIONS

KR-20170035142-A translation (Year: 2017).*
(Continued)

*Primary Examiner* — Kyle T Johnson
(74) *Attorney, Agent, or Firm* — Bridgeway IP Law Group, PLLC; Sang Ho Lee; Hyun Woo Shin

(57) ABSTRACT

An embodiment of the present invention relates to a traverse direction control method, apparatus, and moving object for autonomous driving. More particularly, the traverse direction control apparatus for autonomous driving includes an information collection part for collecting data from one or more cameras mounted on an autonomous moving object; a target point information calculation module for calculating target point information on the basis of information collected from a camera module; and a traverse direction control parameter calculation module configured to obtain, based on the target point information, a traverse direction distance from the moving object at time t to a target point, an angle between a head of the moving object and the target point, and a present yaw rate of the moving object, and
(Continued)

calculate a traverse direction control parameter of time t+1 based on a pre-stored kinematic model.

10 Claims, 8 Drawing Sheets

(51) Int. Cl.
  *B60W 40/114* (2012.01)
  *G06T 7/246* (2017.01)
  *G06T 7/50* (2017.01)

(52) U.S. Cl.
  CPC ............... *G06T 7/246* (2017.01); *G06T 7/50* (2017.01); *B60W 2420/403* (2013.01); *B60W 2520/06* (2013.01); *B60W 2520/10* (2013.01); *B60W 2520/14* (2013.01); *B60W 2520/26* (2013.01); *B60W 2552/45* (2020.02); *B60W 2552/53* (2020.02); *B60W 2720/14* (2013.01); *B60W 2720/26* (2013.01); *B60W 2754/20* (2020.02); *G06T 2207/30256* (2013.01)

(58) Field of Classification Search
  CPC ......... B60W 2520/10; B60W 2520/14; B60W 2520/26; B60W 2552/45; B60W 2552/53; B60W 2720/14; B60W 2720/26; B60W 2754/20; G06T 7/246; G06T 7/50; G06T 2207/30256
  See application file for complete search history.

(56) References Cited

U.S. PATENT DOCUMENTS

| | | | | |
|---|---|---|---|---|
| 2023/0127230 A1* | 4/2023 | Molnar | ................ | B60W 40/12 701/23 |
| 2023/0322208 A1* | 10/2023 | Rojas | ................. | B60W 50/085 701/41 |
| 2025/0263091 A1* | 8/2025 | Kang | ..................... | G06T 7/246 |

FOREIGN PATENT DOCUMENTS

| | | | | | |
|---|---|---|---|---|---|
| EP | 3885867 | A1 | * | 9/2021 | .......... B60W 60/001 |
| JP | 2019-166981 | A | | 10/2019 | |
| JP | 2020-006860 | A | | 1/2020 | |
| JP | 2021-521050 | A | | 8/2021 | |
| KR | 10-1143892 | B1 | | 5/2012 | |
| KR | 10-1348500 | B1 | | 1/2014 | |
| KR | 10-1419844 | B1 | | 7/2014 | |
| KR | 10-2014-0112824 | A | | 9/2014 | |
| KR | 10-1639525 | A | | 7/2016 | |
| KR | 20170035142 | A | * | 3/2017 | ............ B60W 40/12 |
| KR | 20200017571 | A | * | 2/2020 | ............ B60W 30/14 |
| KR | 10-2164606 | B1 | | 10/2020 | |
| KR | 10-2363691 | B1 | | 2/2022 | |

OTHER PUBLICATIONS

CN-110015297-A translation (Year: 2019).*
Combined slip trajectory tracking and yaw stability control for 4wid autonomous vehicles (Year: 2024).*
CN-115476881-A translation (Year: 2022).*
KR-20200017571-A translation (Year: 2020).*
Rho, Kwanghyun et al., "Development of Vision-based Lateral Control System for an Autonomous Navigation Vehicle", Transactions of KSAE, vol. 13, No. 4, pp. 19-25 (2005).

* cited by examiner

TRAVERSE DIRECTION CONTROL APPARATUS AND METHOD FOR AUTONOMOUS DRIVING

TECHNICAL FIELD

An embodiment of the present invention relates to a traverse direction control apparatus and method for autonomous driving, and more particularly to an apparatus and method for enabling control in a linear traversal direction using a camera sensor.

BACKGROUND ART

Autonomous driving refers to recognizing the surrounding environment, judging the driving situation, and controlling an automobile to drive to a given destination without driver intervention.

Recently, with the development of autonomous driving technology, autonomous driving has been attempted using various platforms such as automobiles, airplanes, drones, robots, and ships.

To control the precise movements of a four-wheeled mobile robot, it is important to be robust against many risks arising from the surrounding environment. In the case of automobiles, autonomous driving is mainly performed on roads, so obstacles and driving areas are regular. On the other hand, delivery robots and serving robots drive on sidewalks, crosswalks, and indoor spaces with more complex and diverse obstacles, so, for smooth and safe driving, it is necessary to accurately build a dynamic model of the platform, apply an appropriate controller according to various situations, and create a linear dynamic model rather than a nonlinear one to use computing time appropriately.

Meanwhile, a well-known model of Skid Steering Mobile Robot (SSMR) moves in a manner of sliding between the ground and tires due to the rotation direction or torque difference of each of independently driven wheels without changing the body structure of the mobile robot. The skid-steering manner is utilized in mobile robots for special purposes, such as a robot for exploring various terrains or rough terrain, a robot for space exploration, and a combat robot, because the mobile robots do not have any type of steering device and can rotate in place.

To move to a target point using the skid-steering manner, the error between the robot and the target point was calculated to generate a movement trajectory. However, the error between the robot and a target point cannot be expressed without a nonlinear function when expressed based on the robot coordinates. It is difficult to control with Multi Input Multi Output (MIMO) using this nonlinear model, and since MIMO control is difficult, it is difficult to perform precise control without using a nonlinear control method. However, even if the nonlinear control manner is used, chattering may exist, real-time control may be impossible, or the system may become so complex that maintenance is difficult.

DISCLOSURE

Technical Problem

Therefore, the present invention has been made in view of the above problems, and it is one object of the present invention to provide an apparatus and method for enabling control in a linear traversal direction at low costs using a camera without using expensive equipment such as lidar.

Technical Solution

In accordance with an aspect of the present invention, the above and other objects can be accomplished by the provision of a traverse direction control apparatus for autonomous driving, the traverse direction control apparatus including: an information collection part for collecting data from one or more cameras mounted on an autonomous moving object; a target point information calculation module for calculating target point information based on data collected from the camera module; and a traverse direction control parameter calculation module for obtaining a traverse direction distance from the moving object at time t to a target point, an angle between a head of the moving object and the target point, and a yaw rate of the moving object based on the target point information and for calculating a traverse direction control parameter of time t+1 based on a pre-stored kinematic model.

In accordance with another aspect of the present invention, there is provided a traverse direction control method for autonomous driving by a traverse direction control apparatus, the traverse direction control method including: collecting data from one or more cameras mounted on an autonomous moving object; calculating target point information based on information collected from the camera module; and obtaining a traverse direction distance from the moving object at time t to a target point, an angle between a head of the moving object and the target point, and a yaw rate of the moving object based on the target point information and for calculating a traverse direction control parameter of time t+1 based on a pre-stored kinematic model.

In accordance with yet another aspect of the present invention, there is provided an autonomous moving object, including: an information collection part for collecting data from one or more cameras mounted on an autonomous moving object; a target point information calculation module for calculating target point information based data collected from the camera module; a traverse direction control parameter calculation module for calculating target point information based on information obtained from the camera, obtaining a traverse direction distance from the moving object at time t to a target point, an angle between a head of the moving object and the target point, and a yaw rate of the moving object based on the target point information and calculating a traverse direction control parameter of time t+1 based on a pre-stored kinematic model; a controller for outputting an input signal using the traverse direction control parameter as a control input; and a driving device including a power source, wheels, a steering device, a brake, etc. and for controlling a traverse direction motion of the moving object according to an input signal that is output by the controller.

Advantageous Effects

The present invention is cost-effective because it uses a relatively inexpensive camera compared to LiDARs that cost hundreds to thousands of dollars.

In addition, since it uses only an existing camera, i.e., visual data, it is more robust than a method of controlling via GPS, so it can be controlled continuously.

In addition, an existing dynamics model that is commonly used is a nonlinear model and can be controlled with Single Input Single Output (SISO), but it does not consider all variables that should be considered when a robot moves in a traverse direction. When using a nonlinear controller, it is difficult to apply a commonly used algorithm, and when using a control method utilizing machine learning without a model, it takes a lot of computing time or is difficult to apply in situations where it has not been learned. Therefore, the linear model is utilized to reduce the amount of computation and facilitate the maintenance and application of general-purpose algorithms.

Further, according to one embodiment, in various driving environments such as a situation where it is necessary to rapidly converge to a target point or a situation where smooth driving is desired, it is possible to respond to the situations by simply changing the coefficients. In addition, the value of cornering stiffness can be changed considering a road surface to simulate a traverse direction movement according to the road surface.

DESCRIPTION OF DRAWINGS

FIG. 3 is a diagram for explaining a slip angle of the tire.

DESCRIPTION OF SYMBOLS

Figure 1:
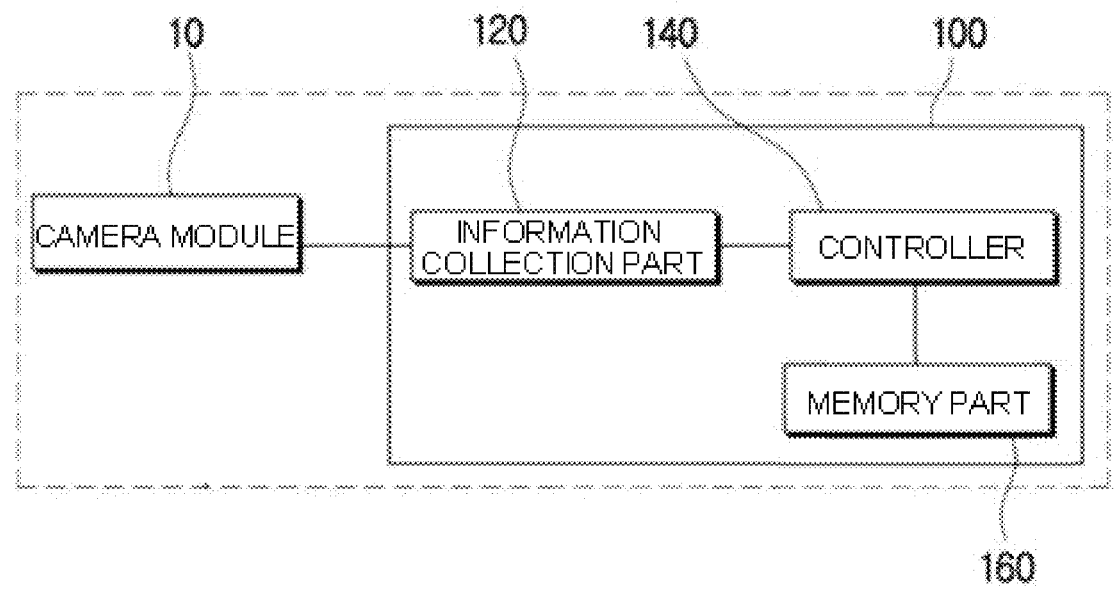
FIG. 1 schematically illustrates the configuration of a traverse direction control parameter calculation apparatus for autonomous driving according to an embodiment of the present invention.

100: traverse direction control apparatus
10: camera module
120: information reception part
140: controller
142: target point information calculation module
144: traverse direction control parameter calculation module
160: memory part

BEST MODE

Hereinafter, an embodiment according to the present invention is described in detail with reference to the attached drawings. The composition of the present invention and the effect thereof will be clearly understood through the detailed description below. In a detailed description of the present invention, it should be noted that the same components will be indicated by the same reference numerals as much as possible even if they are shown on different drawings, and that a detailed description of a known configuration will be omitted if it is determined that it may obscure the gist of the present invention.

FIG. 1 schematically illustrates the configuration of a traverse direction control parameter calculation apparatus for autonomous driving according to an embodiment of the present invention.

As shown in FIG. 1, a traverse direction control parameter calculation apparatus 100 for autonomous driving of the present invention may include an information collection part 120, a controller 140 and a memory part 160.

The information collection part 120 collects information obtained by one or more sensors 10 mounted on an autonomous moving object. The sensors may be, for example, one or more cameras sensors. The information collection part 120 transmits the collected information to the controller 140. In an embodiment, the camera sensors capture an object within the field of view of the camera mounted on the autonomous moving object to generate image information. The angle of view may include the front of an autonomous driving vehicle. In an embodiment, the camera sensors may be stereo camera sensors capable of acquiring two images simultaneously. The camera sensors transmit information acquired by shooting to the controller 140.

The controller 140 controls each component of the traverse direction control parameter calculation apparatus 100 for autonomous driving to estimate the speed of an object for autonomous driving. Each component of the controller 140 is composed of a set of hardware and software that can perform the above functions.

In an embodiment, the controller 140 calculates target point information based on information obtained through the information collection part 120. The calculation of target point information is described in detail with reference to FIG. 2.

In addition, the controller 140 may calculate a traverse direction control parameter based on target point information. The traverse direction control parameter may include a traverse direction interval of the target point and the autonomous moving object (hereinafter referred to as "moving object"); an angle between a head of the moving object and the target point; and a yaw rate of the moving object. Here, the yaw rate is called a yaw angular rate, and refers to the rate at which a rotation angle (yaw angle) changes around a vertical line passing through the center of a moving body.

The memory part 160 stores or databases information, programs, etc. required for the traverse direction control parameter calculation apparatus 100 for autonomous driving to calculate a traverse direction control parameter during autonomous driving of the moving object. For example, the memory part 160 may store information collected by the information collection part 120, or store a mathematical equation for calculating a traverse direction control parameter of the controller 140 and intermediate data generated for calculating a traverse direction control parameter.

In addition, the memory part 160 may transmit the stored information to the controller 140 according to a request of the controller 140.

Figure 2:
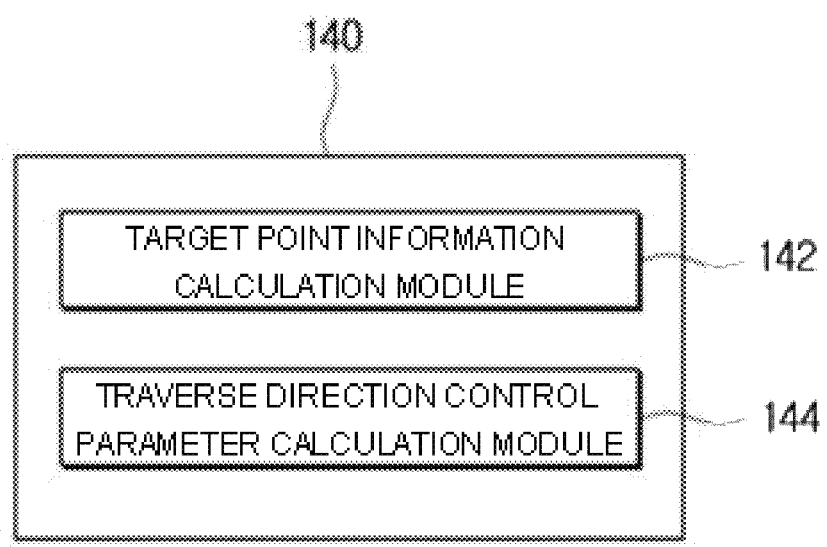
FIG. 2 schematically illustrates the configuration of a controller of the traverse direction control parameter calculation apparatus for autonomous driving according to an embodiment of the present invention.
Figure 3:
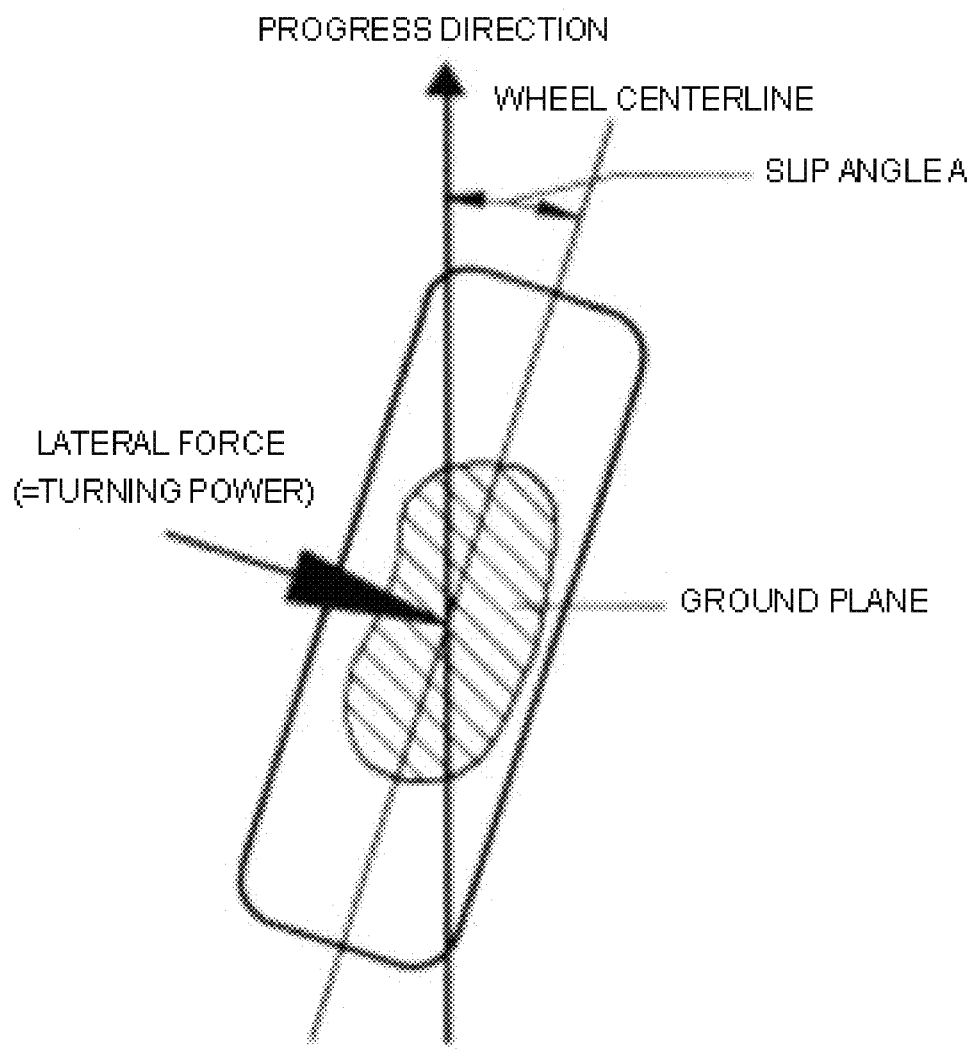
FIG. 3 is a diagram for explaining a slip angle.

FIG. 2 schematically illustrates the configuration of the controller of the traverse direction control parameter calculation apparatus for autonomous driving according to an embodiment of the present invention, and FIG. 3 is a diagram for explaining a slip angle of the tire.

Referring to FIG. 2, the controller (denoted as 140 in FIG. 1) may include a target point information calculation module 142 and a traverse direction control parameter calculation module 144, depending upon the function thereof.

However, each component of the controller 140 does not necessarily have to have a physically different configuration. Each component of the controller 140 may be configured with one processor and may be separated only in software or may be executed with separate execution routines. That is, each component of the controller 140 may be only functionally distinct and may be realized on the same hardware.

The target point information calculation module 142 calculates target point information based on information obtained from an image obtained from the camera module 10.

In an embodiment, the target point information may include one or more of information on a target lane to be tracked and edge information.

For example, the target point information calculation module 142 analyzes obtained image to extract at least one characteristic information. Here, the characteristic information may include specific target information with drivable meaning, drivable or non-drivable area information such as lanes, sidewalks or crosswalks, edges of areas, etc. The target point information calculation module 142 may calculate information on a target lane to be tracked and edge information based on the characteristic information.

The target point information calculation module 142 may obtain relative position coordinates of a target point with respect to the position of the moving object based on information on a target lane to be tracked and edge information.

The traverse direction control parameter calculation module 144 calculates control parameters by applying the traverse direction interval ($e_y$) from the current position coordinates of the moving object to the target point position coordinates thereof, the angle ($e_\psi$) between the head angle of the moving object and the target point, the yaw rate of the moving object ($\psi$) as state variables to a stored kinematic model based on target point information. Here, the kinematic model uses a yaw rate, which causes the convergence to a target point, as a model input when applied as a state space model for the moving object and the target point. That is, the yaw rate of the moving object calculated through the kinematic model may be used as a control parameter of the moving object.

The kinematic model may include a kinematic model that does not consider the force causing a motion; and a dynamic model that considers the traverse force causing a motion.

The target point information calculation module 142 may calculate control parameters by the kinematic model that does not consider the forward viewing distance of a camera and may calculate control parameters by the dynamic model that considers a forward viewing distance. In a situation where the forward viewing distance is not determined or in a low-speed situation where tires have little lateral slip, the control parameters of a moving object may be calculated using only the kinematic model. Meanwhile, in a situation where the forward viewing distance can be known or in a high-speed situation where there is a difference between the direction in which wheels are placed and the direction in which the wheels are moving, the control parameters of the moving object may be calculated using the dynamic model. Referring to FIG. 3, the moving object receives a traverse force (lateral force) due to the speed difference between the left and right wheels. When a traverse force is applied, a difference occurs between the direction in which the tire is placed and the actual direction in which the tire moves. This difference is called a slip angle ($\alpha$), and the skid-steering manner rotates considering the slip angle ($\alpha$). At this time, the dynamic modeling considering the slip angle ($\alpha$) is performed at high speeds.

Figure 4:
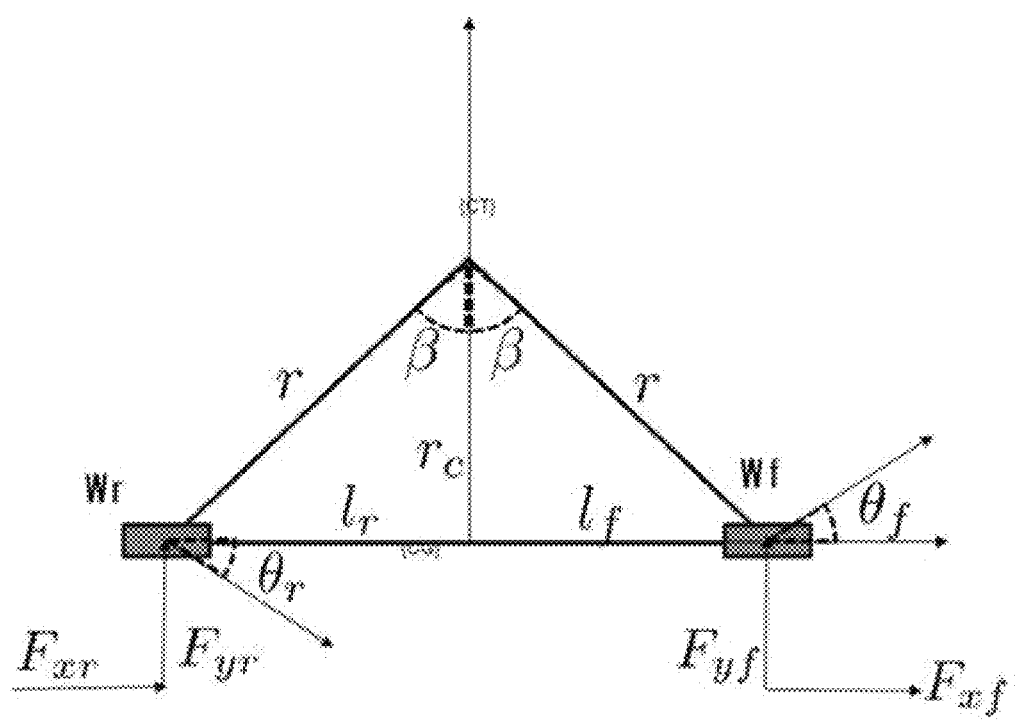
FIG. 4 is a state diagram for explaining the state variables of a moving object according to an embodiment.
Figure 5:
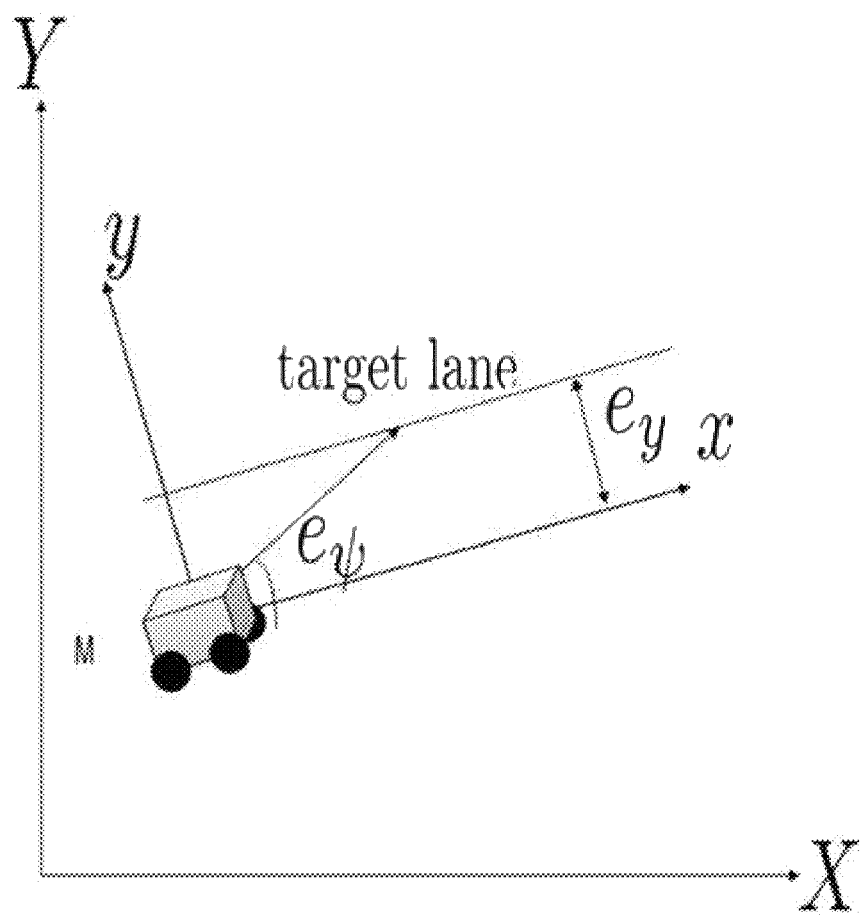
FIG. 5 is a state diagram for explaining state variables between a moving object and target information in a model considering the dynamics of a moving object that does not consider a forward viewing distance of a camera according to the present invention.
Figure 6:
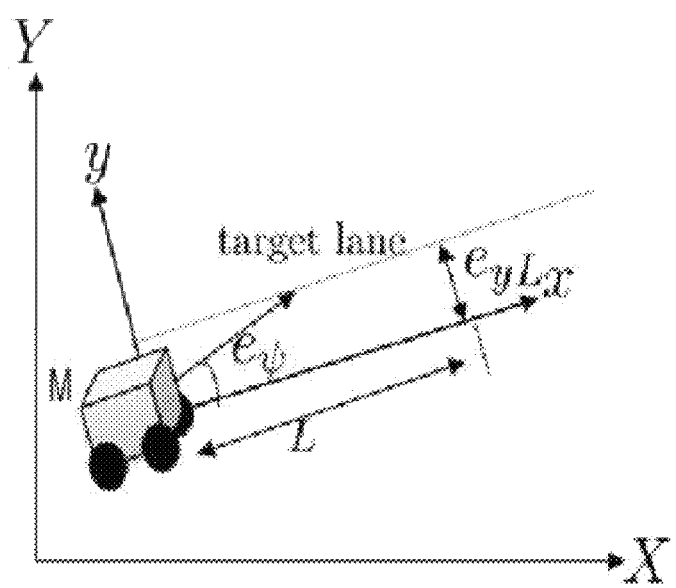
FIG. 6 is a state diagram for explaining state variables between a moving object and target information in a model considering the kinematics of a moving object that considers a forward viewing distance of a camera according to the present invention.

FIG. 4 is a state diagram for explaining the state variables of a moving object according to an embodiment. FIG. 5 is a state diagram for explaining state variables between a moving object and target information in a model considering the dynamics of a moving object that does not consider a forward viewing distance of a camera according to the present invention. FIG. 6 is a state diagram for explaining state variables between a moving object and target information in a model considering the kinematics of a moving object that considers a forward viewing distance of a camera according to the present invention.

FIG. 4 exemplifies a bicycle with two wheels (bicycle model) for convenience of explanation, but is not limited thereto. Since the gap between wheels is small compared to the turning radius, the error does not appear to be large even if the bicycle model is applied to a four-wheeled vehicle.

First, referring to FIG. 4, the coordinate system of the moving object may be utilized to induce the frictional force acting between each wheel and the ground while the moving object is moving.

In FIG. 4, {CT} is an abbreviation for Center of Turn and means the center of rotation.

{CG} is an abbreviation for Center of Gravity and means the center of gravity.

F is a friction force, $F_{xr}$ is a longitudinal friction force acting on a rear wheel, $F_{yr}$ is a traverse direction friction force acting on a rear wheel, $F_{xf}$ is a longitudinal friction force acting on a front wheel, and $F_{xf}$ is a traverse direction friction force acting on a front wheel.

r is a distance from the center of rotation to a wheel, and $r_c$ is a distance from the center of rotation to the center of a moving object.

$l_f$ is a distance from the center of gravity to a front wheel, and lr is a distance from the center of gravity to a rear wheel.

$\theta_r$ is a slip angle acting on a rear wheel, and $\theta_f$ is a slip angle acting on a front wheel.

β is a slip angle at the center of rotation.

First, the kinematic model is examined.

Kinematic modeling may be expressed as Mathematical Equation 1.

[Mathematical Equation 1]

$$x(k+1) = \begin{bmatrix} 1 & T_s V_x & 0 \\ 0 & 1 & -T_s \\ 0 & 0 & 1 \end{bmatrix} x(k) + \begin{bmatrix} 0 \\ 0 \\ \frac{V_x}{l_{fr}} \end{bmatrix} u(k) + \begin{bmatrix} 0 \\ kT_s V_x \\ 0 \end{bmatrix}$$

$$x = [e_y, e_\psi, \dot{\psi}]$$

In Mathematical Equation 1, state variables are the traverse direction interval ($e_y$) from the current position coordinates of the moving object to the position coordinates of the target point, the angle ($e_\psi$) between the head angle of the moving object and the target point, the yaw rate ($\psi$) of the moving object.

In Mathematical Equation 1, Ts is a control sample time. k is a curvature, and Vx is a longitudinal velocity.

In addition, $$\beta = \delta_s - \beta, \tan\beta = \frac{l_f}{r_c}$$

-continued
$$\dot{\psi} = \frac{V_x}{r_c} = \frac{V_x}{l_f}\tan\frac{\delta_s}{2}$$

$$\dot{\psi}_{des} \approx kV_x$$

By Mathematical Equation 1, the following equations may be obtained:

$$e_y(k+1) = e_y(k) + T_s V_x e_\psi(k) - \frac{T_s}{2}V_x\delta_s(k)$$

$$e_\psi(k+1) = e_\psi(k) + T_s(\dot{\psi}_{des} - \dot{\psi}(k))$$

Next, the dynamic model is examined.
Dynamic modeling may be expressed as Mathematical Equation 2.

[Mathematical Equation 2]

$$x(k+1) = \begin{bmatrix} 1 & T_sV_x & -T_sL \\ 0 & 1 & -T_s \\ 0 & 0 & 1+T_sa_{33} \end{bmatrix} x(k) + \begin{bmatrix} -\frac{T_sV_x}{2} \\ 0 \\ T_sb_{31} \end{bmatrix} u(k)$$

$$x = [e_y, e_\psi, \dot{\psi}]$$

$$a_{33} = \frac{2l_f^2 C_\alpha}{V I_z},\ b_{31} = \frac{l_f C_\alpha}{I_z}$$

In Mathematical Equation 2, L is the length of a look ahead, and is an element for determining how many meters ahead a camera will react and move. This value may be preset. $C_\alpha$ is a cornering stiffness. The cornering stiffness refers to a differential value where a side force occurs at a slip angle of 0 degrees according to the relationship between the slip angle of a moving object tire and the side force. It serves as a standard for the magnitude of force generated when changing the direction of a tire of a moving object that is continuously moving. This cornering stiffness is one of factors that affect the steering and stability of a moving object.

$I_z$ is the moment of inertia.
In Mathematical Equation 2, $$\beta = \delta_s - \beta,\ \tan\beta = \frac{l_f}{r_c}$$

$$\dot{\psi} = \frac{V_x}{r_c} = \frac{V_x}{l_f}\tan\frac{\delta_s}{2}$$

$$\dot{\psi}_{des} \approx 0$$

By Mathematical Equation 2, the following equations may be obtained:

$$e_y(k+1) = e_y(k) + T_s V_x e_\psi(k) - T_s L\dot{\psi} - \frac{T_s}{2}V_x\delta_s(k)$$

$$e_\psi(k+1) = e_\psi(k) + T_s(\dot{\psi}_{des} - \dot{\psi}(k))$$

$$\dot{\psi}(k+1) = \frac{2l_f^2 C_\alpha}{V I_z}\dot{\psi}(k) + \frac{l_f C_\alpha}{I_z}\delta_s(k)$$

Accordingly, the traverse direction control parameter calculation module 144 may change cornering stiffness according to a road condition and apply it to the dynamic model.

As another embodiment, a method for estimating an object speed for autonomous driving according to the present invention having the configuration described above is described below with reference to FIG. 6.

Figure 7:
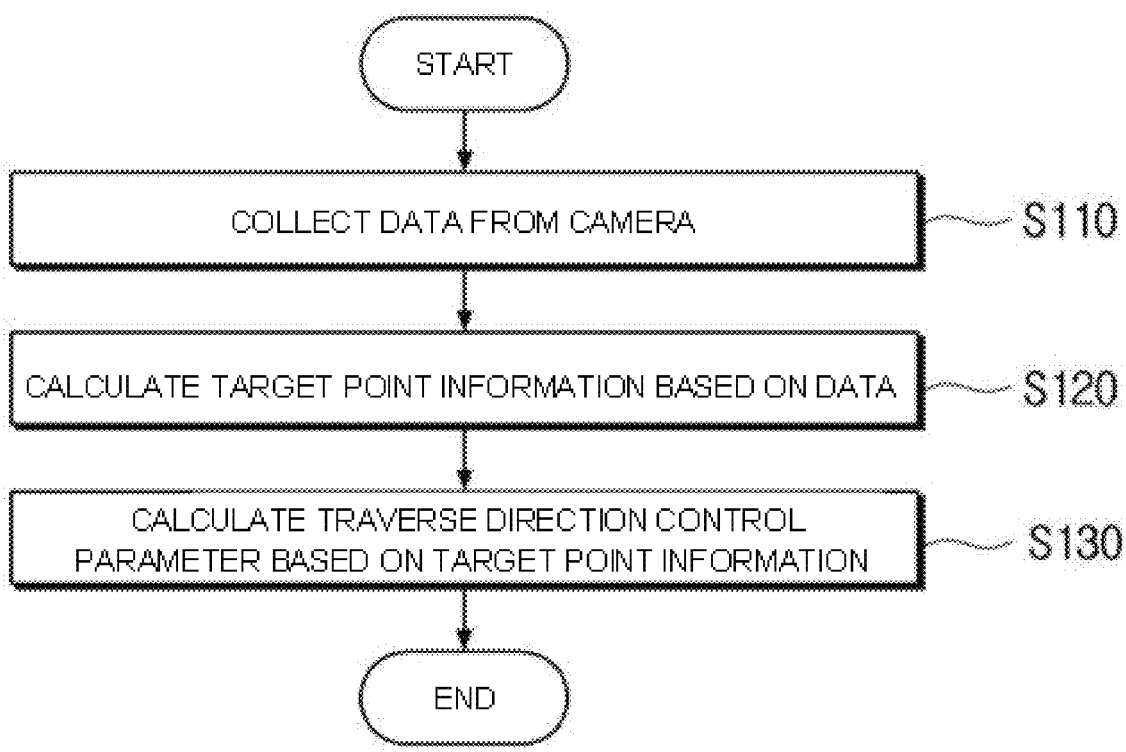
FIG. 7 is a flowchart for explaining a traverse direction control method for autonomous driving according to an embodiment of the present invention.

FIG. 7 is a flowchart for explaining a traverse direction control method for autonomous driving by a traverse direction control apparatus according to an embodiment of the present invention.

Referring to FIG. 7, in step S110, the information collection part collects data from one or more cameras mounted on an autonomous moving object.

In step S120, the controller calculates target point information based on data collected from the camera module. The controller analyzes images in the collected data to extract at least one characteristic information, and then calculates one of target lane and edge information based on the characteristic information. The characteristic information includes one or more of specific target information having a drivable meaning, drivable or non-drivable area information such as a lane, sidewalk, or crosswalk, and edges of the area.

In step S130, the controller obtains a traverse direction distance from the moving object at time t to a target point, an angle between a head of the moving object and the target point, and a present yaw rate of the moving object based on the target point information, and calculates a traverse direction control parameter of time t+1 based on a pre-stored kinematic model.

The controller applies a traverse direction interval from the current position of the moving object to the position of the target point, an angle between the head angle of the moving object and the target point, and a yaw rate of the moving object as state variables to a pre-stored kinematic model to calculate a control parameter. The traverse direction control parameter is a yaw rate of time t+1. A method of calculating the control parameter has been described with reference to FIGS. 4 to 6, so a detailed description thereof is omitted.

Figure 8:
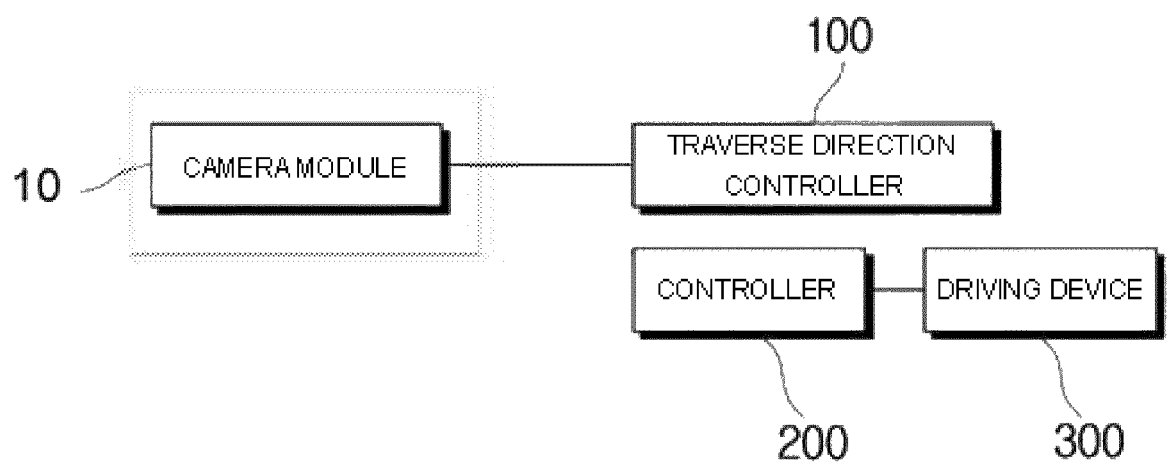
FIG. 8 illustrates the driving of a moving object where the traverse direction control apparatus for autonomous driving according to an embodiment of the present invention is mounted.

FIG. 8 illustrates the driving of a moving object where the traverse direction control apparatus for autonomous driving according to an embodiment of the present invention is mounted.

Referring to FIG. 8, a moving object 1 (hereinafter referred to as moving object) equipped with the traverse direction control apparatus for autonomous driving may include a camera module 10, a traverse direction control apparatus 100, a controller 200 and a driving device 300. As described in the above embodiment, the camera module 10 may transmit information to the traverse direction control apparatus 100, and the traverse direction control apparatus 100 and the moving object 1 may transmit/receive information. In addition, the controller 200 may transmit a control command to the driving device 300.

The camera module 10 and the traverse direction control apparatus 100 are the same as the camera module 10 and traverse direction control apparatus 100 described with reference to FIG. 1, so a detailed description thereof is omitted. However, the traverse direction control apparatus 100 discretely generates a traverse direction control parameter and transmits it to the controller 200 until the moving object 1 arrives at the destination. Here, the traverse direction control parameter may be a yaw rate of time t+1.

The controller 200 controls each component of the moving object and, in particular, outputs an input signal, which uses a traverse direction control parameter as a control input, from the traverse direction control apparatus 100.

The controller 200 may control the driving device 300 to drive the moving object 1 until the moving object 1 reaches a preset target position, and may end driving when it reaches the destination.

The driving device 300 includes a power source, wheels, a steering device, a brake, etc., and controls the traverse direction motion of the moving object according to an input signal that is output by the controller 200.

Here, the power source may be adopted in various ways, such as an electric-based motor or a fossil fuel-based engine, depending on the size and function of the moving object.

According to an embodiment of the present invention, the traverse direction motion of a moving object may be controlled using a camera that is relatively inexpensive compared to a lidar.

Here, it will be understood that each block of processing flow diagrams and combinations of the flow diagrams can be performed by computer program instructions. These computer program instructions may be installed in a processor of a general-purpose computer, a special-purpose computer, or other programmable data processing equipment, so that the instructions executed by the processor of the computer or other programmable data processing equipment create means for performing the functions described in the flowchart block(s). These computer program instructions may also be stored in a computer-available or computer-readable memory that can be directed to a computer or other programmable data processing equipment to implement functions in a particular manner, so that the instructions stored in the computer-available or computer-readable memory can also produce a manufactured item that includes instruction means for performing the functions described in the flowchart block(s). Since the computer program instructions can be installed on a computer or other programmable data processing equipment, the instructions that create a process in which a series of operational steps are performed on the computer or other programmable data processing equipment to execute a computer-executable process and execute the computer or other programmable data processing equipment can also provide steps for executing the functions described in the flowchart block(s).

In addition, each block may represent a module, segment, or portion of code that includes one or more executable instructions for performing a specific logical function(s). It should also be noted that in some alternative implementation examples, the functions mentioned in the blocks may occur out of order. For example, the two blocks shown in succession may actually be executed substantially simultaneously, or the blocks may sometimes be executed in reverse order, depending on a corresponding function.

Here, the term "part" in the embodiments of the present invention means a software component or a hardware component, such as a field-programmable gate array (FPGA) or an application-specific integrated circuit (ASIC), that performs a specific function. However, the term "part" is not limited to software or hardware. The "part" may be formed so as to be stored in an addressable storage medium, or may be formed so as to operate one or more processors. Thus, for example, the term "part" may refer to components such as software components, object-oriented software components, class components, and task components, processes, functions, properties, procedures, subroutines, segments of program codes, drivers, firmware, microcodes, circuits, data, databases, data structures, tables, arrays, and parameters. Functions provided by elements and "parts" may be combined in a smaller number of elements and "parts" or may be separated into additional elements and "parts". In addition, the components and '~parts' may be implemented to regenerate one or more CPUs within a device or a secure multimedia card.

The aforementioned description of the present invention is provided by way of example and those skilled in the art will understand that the present invention can be easily changed or modified into other specified forms without change or modification of the technical spirit or essential characteristics of the present invention. Therefore, it should be understood that the aforementioned examples are only provided by way of example and not provided to limit the present invention. It should be understood that the scope of the present invention is defined by the following claims, rather than the detailed description, and the invention is to cover all modifications, equivalents, and alternatives falling within the spirit and scope of the invention as defined by the claims.

Meanwhile, preferred embodiments of the present invention have been disclosed in the present specification and drawings and specific terms have been used therein, but they are only provided to explain the present invention and help understanding of the present invention and are not intended to limit to the scope of the present invention. In addition to the embodiments disclosed herein, it will be apparent to those skilled in the art that other modifications based on the technical idea of this specification may be made.

The invention claimed is:

1. A traverse direction control apparatus for autonomous driving, the traverse direction control apparatus comprising:

an information collection processor configured to collect data from one or more cameras mounted on an autonomous moving object;

a target point information calculation processor configured to calculate target point information based on the data collected from the one or more cameras; and a traverse direction control parameter calculation processor configured to continuously generate a traverse direction control parameter by:

obtaining a traverse direction distance from the autonomous moving object at time t to a target point, an angle between a head of the autonomous moving object and the target point, and a yaw rate of the autonomous moving object based on the target point information, and calculating the traverse direction control parameter of time t+1 based on a pre-stored kinematic model; and a memory configured to transmit the continuously generated traverse direction control parameter to a controller of the autonomous moving object until the autonomous moving object arrives at a target destination, wherein the controller controls a traverse direction motion of the autonomous moving object by outputting a control signal using the traverse direction control parameter until the autonomous moving object arrives at the target destination, and wherein the pre-stored kinematic model is a dynamic model, and modeled as in Mathematical Equation 2:

[Mathematical Equation 2]

$$x(k+1) = \begin{bmatrix} 1 & T_s V_x & -T_s L \\ 0 & 1 & -T_s \\ 0 & 0 & 1 + T_s a_{33} \end{bmatrix} x(k) + \begin{bmatrix} -\dfrac{T_s V_x}{2} \\ 0 \\ T_s b_{31} \end{bmatrix} u(k)$$

$$x = [e_y, e_\psi, \dot\psi]$$

$$a_{33} = \frac{2 l_f^2 C_\alpha}{V I_z}, \; b_{31} = \frac{l_f C_\alpha}{I_z}$$

where $e_y$ is a traverse direction interval from current position coordinates of the autonomous moving object to target point position coordinates thereof, $e_\psi$ is the angle between the head of the autonomous moving object and the target point, $\psi$ is the yaw rate of the autonomous moving object, L is a forward viewing distance, $C_\alpha$ is a cornering stiffness, and $I_z$ is a moment of inertia.

2. The traverse direction control apparatus according to claim 1, wherein the target point information tracks one of target lane and edge information.

3. The traverse direction control apparatus according to claim 1, wherein the traverse direction control parameter is the yaw rate of time t+1.

4. The traverse direction control apparatus according to claim 1, wherein
the dynamic model applied in a situation where the forward viewing distance is determined, or in a high-speed situation where there is a difference between a direction in which wheels are placed and a direction in which the wheels are traveling.

5. A traverse direction control method for autonomous driving by a traverse direction control apparatus, the traverse direction control method comprising:
calculating target point information based on data collected from one or more cameras mounted on an autonomous moving object;
continuously generating a traverse direction control parameter by:
obtaining a traverse direction distance from the autonomous moving object at time t to a target point, an angle between a head of the autonomous moving object and the target point, and a current yaw rate of the autonomous moving object based on the target point information, and
calculating the traverse direction control parameter of time t+1 based on a pre-stored kinematic model; and
transmitting the continuously generated traverse direction control parameter to a controller of the autonomous moving object until the autonomous moving object arrives at a target destination,
wherein the controller controls a traverse direction motion of the autonomous moving object by outputting a control signal using the traverse direction control parameter until the autonomous moving object arrives at the target destination, and wherein the pre-stored kinematic model is a dynamic model, and modeled as in Mathematical Equation 2:
[Mathematical Equation 2]

$$x(k+1) = \begin{bmatrix} 1 & T_s V_x & -T_s L \\ 0 & 1 & -T_s \\ 0 & 0 & 1 + T_s a_{33} \end{bmatrix} x(k) + \begin{bmatrix} -\dfrac{T_s V_x}{2} \\ 0 \\ T_s b_{31} \end{bmatrix} u(k)$$

$$x = [e_y, e_\psi, \dot\psi]$$

$$a_{33} = \frac{2 l_f^2 C_\alpha}{V I_z}, \; b_{31} = \frac{l_f C_\alpha}{I_z}$$

where $e_y$ is a traverse direction interval from current position coordinates of the autonomous moving object to target point position coordinates thereof, $e_\psi$ is the angle between the head of the autonomous moving object and the target point, $\psi$ is a yaw rate of the autonomous moving object, L is a forward viewing distance, $C_\alpha$ is a cornering stiffness, and $I_z$ is a moment of inertia.

6. The traverse direction control method according to claim 5, wherein the calculating the target point information based on the data collected from the one or more cameras includes:
analyzing an image included in the collected data to extract at least one characteristic information, and
calculating at least one of target lane and edge information based on the characteristic information,
wherein the characteristic information comprises at least one selected from a group consisting of:
specific target information indicating drivability,
information of drivable or non-drivable area, the drivable or non-drivable area including a lane, a sidewalk, or a crosswalk, and
edges of the area.

7. The traverse direction control method according to claim 5, wherein the calculating the target point information based on the data collected from the one or more cameras includes calculating control parameter by applying the traverse direction interval from a current position of the autonomous moving object to a target point position thereof, the angle between a head angle of the autonomous moving object and the target point, and the yaw rate of the autonomous moving object as state variables to the pre-stored kinematic model.

8. The traverse direction control method according to claim 7, wherein the traverse direction control parameter is the yaw rate of time t+1.

9. An autonomous moving object comprising:
one or more cameras configured to photograph surroundings of a moving object;
a traverse direction control apparatus configured to:
calculate target point information based on information obtained from the one or more cameras,
obtain a traverse direction distance from the moving object at time t to a target point, an angle between a head of the moving object and the target point, and a present yaw rate of the moving object based on the target point information,
calculate a traverse direction control parameter of time t+1 based on a pre-stored kinematic model;

transmitting the traverse direction control parameter that is continuously generated to a controller of the moving object until the moving object arrives at a target destination;

the controller configured to output an input signal using the traverse direction control parameter as a control input; and a driving device comprising a power source, wheels, a steering device, and a brake, wherein the driving device controls a traverse direction motion of the moving object according to the input signal that is output by the controller until the moving object arrives at the target destination, wherein the pre-stored kinematic model comprises a kinematic model and a dynamic model, wherein the kinematic model is applied in a situation where a forward viewing distance is not determined, or in a low-speed situation where traverse direction slipping of tires does not occur, and wherein the dynamic model is applied in a situation where the forward viewing distance is determined, or in a high-speed situation where there is a difference between a direction in which wheels are placed and a direction in which the wheels are traveling.

10. The autonomous moving object of claim 9, wherein the pre-stored kinematic model is the dynamic model, and modeled as in Mathematical Equation 2:

$$x(k+1) = \begin{bmatrix} 1 & T_s V_x & -T_s L \\ 0 & 1 & -T_s \\ 0 & 0 & 1+T_s a_{33} \end{bmatrix} x(k) + \begin{bmatrix} -\dfrac{T_s V_x}{2} \\ 0 \\ T_s b_{31} \end{bmatrix} u(k)$$

$$x = [e_y, e_\psi, \dot{\psi}]$$

$$a_{33} = \dfrac{2l_f^2 C_\alpha}{V I_z}, b_{31} = \dfrac{l_f C_\alpha}{I_z}$$

where $e_y$ is a traverse direction interval from current position coordinates of the moving object to target point position coordinates thereof, $e_\psi$ is the angle between the head of the moving object and the target point, $\psi$ is a yaw rate of the moving object, L is the forward viewing distance, $C_\alpha$ is a cornering stiffness, and $I_z$ is a moment of inertia.

* * * * *